Figure 1:
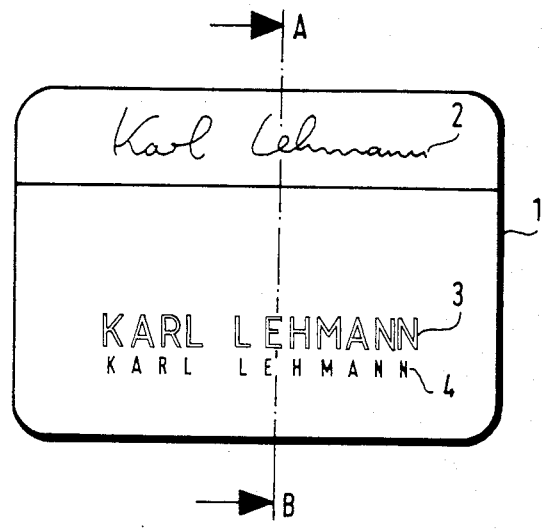

United States Patent [19]

Maurer et al.

[11] Patent Number: 4,672,891

[45] Date of Patent: Jun. 16, 1987

[54] METHOD OF PRODUCING AN IDENTIFICATION CARD

[75] Inventors: Thomas Maurer; Ludwig Devrient, both of Munich, Fed. Rep. of Germany

[73] Assignee: GAO Gesellschaft fur Automation und Organisation mbH, Fed. Rep. of Germany

[21] Appl. No.: 844,378

[22] Filed: Mar. 26, 1986

Related U.S. Application Data

[62] Division of Ser. No. 563,770, Dec. 21, 1983, Pat. No. 4,597,592.

[30] Foreign Application Priority Data

Dec. 31, 1982 [DE] Fed. Rep. of Germany ....... 3248784

[51] Int. Cl.⁴ .............................................. B42D 15/02
[52] U.S. Cl. ...................................... 101/32; 101/368; 283/75; 283/904
[58] Field of Search .................... 283/75, 904; 101/32, 101/369, 368

[56] References Cited

U.S. PATENT DOCUMENTS

| | | |
|---|---|---|
| 3,015,267 | 1/1962 | Dashew . |
| 3,787,873 | 1/1974 | Sato et al. . |
| 3,885,928 | 12/1974 | Kinney et al. . |
| 4,032,691 | 6/1977 | Kido et al. . |
| 4,171,864 | 10/1979 | Jung et al. ...................... 283/75 X |
| 4,456,639 | 6/1984 | Drower et al. . |
| 4,504,083 | 3/1985 | Devrient et al. . |
| 4,507,346 | 3/1985 | Maurer et al. . |

FOREIGN PATENT DOCUMENTS

| | | |
|---|---|---|
| 2223290 | 4/1973 | Fed. Rep. of Germany . |
| 2299972 | 9/1976 | France . |
| 2044175 | 10/1980 | United Kingdom . |
| 2092519 | 8/1982 | United Kingdom . |

*Primary Examiner*—Clifford D. Crowder
*Attorney, Agent, or Firm*—Bacon & Thomas

[57] ABSTRACT

Data present on identification cards in a high-embossed form are protected against attempted forgery and falsification. This protection consists in providing on the identification card, along with the data record in a high-embossed form, a second identical data record which may be visually tested without auxiliary means and is inscribed in the identification card by means of a laser recorder.

7 Claims, 5 Drawing Figures

METHOD OF PRODUCING AN IDENTIFICATION CARD

This application is a division, of application Ser. No. 563,770, filed Dec. 21, 1983, now U.S. Pat. No. 4,597,592.

The invention relates to an identification card bearing alphanumeric characters present in a high-embossed form so as to be employable as a printing block, and further printed information in the form of alphanumeric characters or pictures, as well as a method of producing same.

It has been customary for some time to provide identification cards with high-embossed characters. The customer-related data, such as the name of the card owner, his account number and so on, are usually applied to the identification card in this manner.

High-embossing of identification cards has proved especially useful since the personalization of the card, i.e. the application of the customer's data, can be carried out on the finished laminated card after the rejects due to imperfect pressure and imperfect lamination have already been eliminated. High-embossed data may be provided in almost all types of cards, regardless of their construction. Because such cards act as a printing block in combination with an ink ribbon, they are very easy to use for transferring the customer's data onto bills, etc.

However, it has proved particularly disadvantageous that the high-embossed characters can be removed by extremely simple means by embossing them back or ironing them flat, and then be replaced by other high-embossed characters. Since the high-embossed characters give a card its individuality and provide the only way of establishing the relation to the customer or the customer's account, it is obvious that the customer's account cannot be charged after a transaction has been concluded when these data have been secretly changed. The damages due to such manipulation already run into the millions in the United States of America alone.

Since the use of high-embossed cards has now become widespread in all sectors of the economy and the advantages of such rapid and uncomplicated data transfer cannot be obtained by any other type of card, people have been looking for years for ways of continuing to use high-embossing but simultaneously preventing manipulation or making manipulation recognizable to anyone without auxiliary means.

A great variety of proposals have been made over the years to solve this problem.

For example, the selection of bizarrely shaped special characters was supposed to make it more difficult to re-emboss the high-embossed characters manipulatively, since the conventional stamp dies are useless for this kind of card. However it has turned out that it is possible to produce any stamp dies one wants by simply casting the positive and negative reliefs of the identification cards, so that special characters could not prevent the cards from being falsified.

An attempt was also made to prevent re-embossing by filling in with synthetic material the depressions in the back of the card resulting from the embossing. Since re-embossing is usually carried out after heating the card or, in the most simple case, with a hot iron, the filler was provided, in accordance with a further proposal, with heat indicators to indicate subsequent heating of the card additionally by an irreversible change of color.

Neither of these proposals was put into practice since the filler, when applied subsequently, cannot be limited to the depressions, and the material applied in the surrounding area considerably impairs the appearance of the back of the card. Furthermore, it is very time-consuming to fill in the negative relief of the card subsequently, which makes this measure economically uninteresting for the production of large numbers of cards.

In order to rule out the possibility of re-embossing from the start, another method became known by which the personalization data, embossed into metal plates, are already transferred onto the card surface during lamination. During the laminating process, the card material softens and flows into the depressions in the metal plate, without causing any negative relief on the back. Thus high-embossing is carried out without allowing for the possibility of re-embossing the characters. However, since a metal plate bearing engraved personalization data must be produced for each card according to this method, the latter also failed to find wide acceptance for economic reasons.

A further proposal for preventing the manipulation of data was to provide an identical copy of the card stored in a hologram on the card. Testing is carried out in a device which projects both the actual appearance of the card and the copy stored in the hologram beside or on top of one another on a display screen. Since the image stored in the hologram cannot be subsequently changed, the comparison of the two projections on the display screen is supposed to expose any manipulation.

Although subsequent changes in the card may be reliably recognized by this method, it proved to be disadvantageous that relatively complicated and expensive testing devices are necessary for testing, and it is not possible to test the protection without auxiliary means at all. Since the production of the hologram can only be carried out after personalization of the card, and the development and completion of the hologram require further time-consuming procedural steps, the integration of the hologram into the proper identification card also causes problems during the production of the card since the holograms cannot be distinguished from each other without a reading device and the memory contents of the holograms are not revealed to the naked eye. The production of such cards is very elaborate for this reason, especially when it involves large numbers. It is virtually unjustifiable economically to repeat the production of reject cards, due to the production sequence necessarily being interrupted and the necessary assignment of data. Such cards have also failed to gain wide acceptance in practice.

It has also been proposed as a means of preventing data from being falsified to personalize the completed laminated card using a laser recorder. It is true that any type of card may be provided with absolutely unfalsifiable data in this way, no matter how it is constructed, and the characters may also show relief-type surface deformation, but such cards are usually not suitable for transferring card data onto other data carriers, as opposed to high-embossed cards, so that the function of the high-embossed cards cannot be taken over by laser-personalized cards either.

The invention is thus based on the problem of proposing an identification card having high-embossed data, provided with means for preventing both forgery and falsification of the card data, or in which such unauthorized measures are recognizable without any additional means, and in which the means of protection can be provided in an economical manner, for mass production as well, regardless of the construction of the card.

This problem is solved by the means stated in the characterizing part of the main claim. A method for producing such cards is stated in the method claims.

The invention is based on the finding that, in order to meet these requirements, some of which are very contradictory, it does not suffice to provide the cards with additional elements or double data records. It is instead necessary to supplement the high-embossed data, which are useless as far as security is concerned, by data of high security value which can be tested without auxiliary means, providing them in such a way that not only complex data records can be contrasted and compared with each other, but the correctness of each single element of this data record is to be tested alone, without any difficulties of correlation.

By using the laser recording technique, it is possible to provide protection of the high-embossing on each card in a nearly unfalsifiable manner and without any difficulties, i.e. without interrupting the production process. Thus the production of the cards may take place in one self-contained process. The problems due to the correlation of data records are avoided.

It also proves advantageous that the protection may be varied at will and thus adapted to the design of a specific type of card. Since the protection may be put in the background practically as far as one chooses by various embodiments (reduction in size, coinciding negative or positive writing, etc.), the optical appearance is not impaired in any way. Due to the optically recognizable, irreversible change in the material produced by the laser writing, which may also extend inside the card, any unrecognized change, removal of or addition to the characters is virtually ruled out. In a special embodiment the characters also show a characteristic microrelief, which allows not only for visual testing of the authenticity of the characteristic features of the laser writing, but also for their manual testing.

If laser characters are assigned to each high-embossed character directly, this involves the further advantage that the cards may be subjected to crude superficial testing during which the presence and completeness of the laser writing are detected first and foremost. If single characters deviate from the norm, it is possible to test them more exactly without the assignment of the laser characters to the high-embossed characters causing any difficulties.

Figure 2:
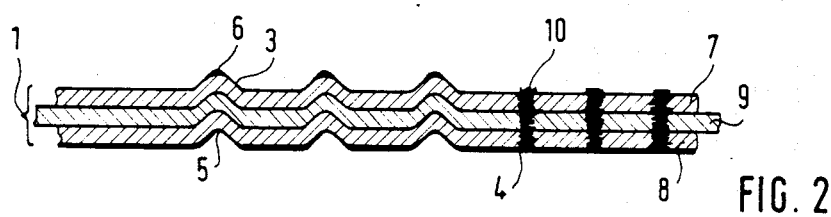
Figure 3:
Figure 4:
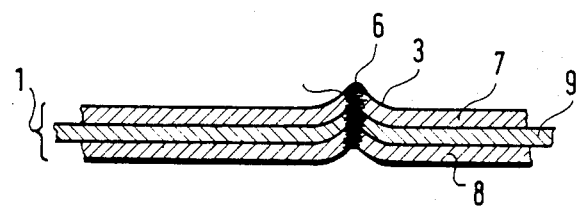
Figure 5:
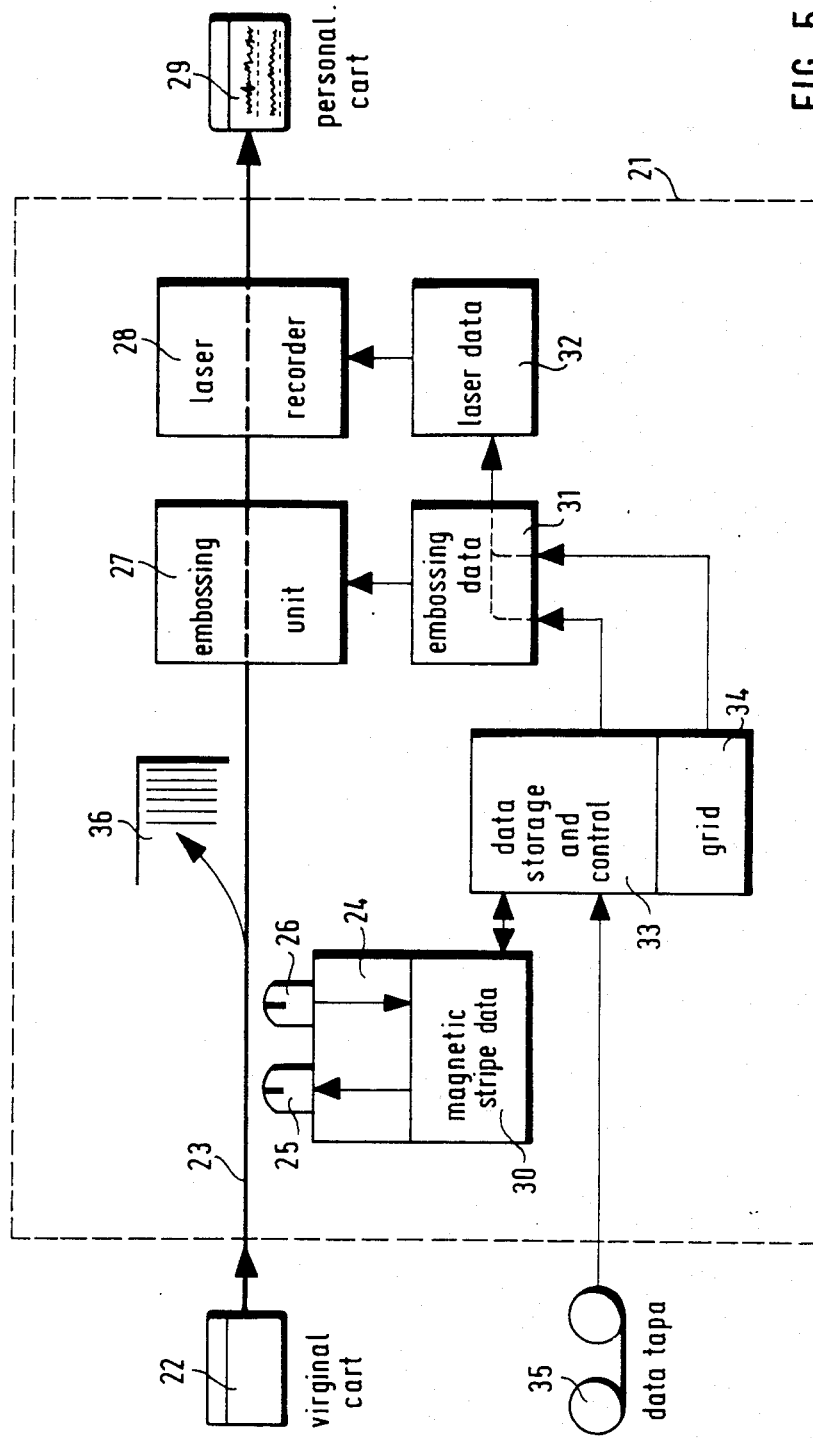

Further advantages and developments of the invention can be found in the subclaims and the following embodiments, which shall be explained in more detail with reference to the adjoined drawings. These show:

FIG. 1 —an identification card from the top, having high-embossed characters and laser characters assigned to them FIG. 2 —a cross-section A-B of FIG. 1, showing the structural differences between high-embossed and laser-written data FIGS. 3 and 4 —further embodiments of the inventive protection of high-embossing FIG. 5 —a block diagram showing the procedural sequence of the production of the card FIG. 1 shows an identification card 1 from the top, in which the inventive means of protection are apparent.

Identification card 1 exhibits, in the upper area of the card, a signature stripe 2 bearing the signature of the card owner in his own hand. In the lower area of the card the name of the card owner is provided in high-embossed characters 3. These characters 3 are executed in such a way that they may be transferred onto other data carriers under the effect of pressure and in combination with an ink ribbon. Further high-embossed characters 3 are usually provided on identification cards, indicating the address of the card owner, his account number, the card number, etc., if required. For the sake of simplicity, any further characters, as well as the general printed pattern which is also usually provided and contains information on the issuing institute, etc., have been left out here.

Under high-embossed characters 3, further characters 4 are provided having the same information content as the high-embossed characters. They are also visually recognizable and are applied to the inside of the card by a laser recorder in an unfalsifiable manner.

These characters 4 applied by means of the laser recorder, referred to as "laser characters" or "lasered characters" for short, are applied in such a way that each character is arranged exactly underneath the corresponding high-embossed character 3. It would also be conceivable on the basis of the invention to provide laser characters 4 in a different area of the card. However, the embodiment shown in FIG. 1 is particularly advantageous since it allows for a simple character-for-character comparison without any assignment problems. It also proves to be particularly advantageous in this embodiment that it is possible to ascertain the completeness of both sets of characters at a glance.

Since unrecognized additions to laser characters 4 are ruled out due to their characteristic appearance and the technological resources necessary to produce them, manipulation which used to be possible by merely adding high-embossed characters 3 can now be readily recognized due to the lack of a laser character, even without testing the information content of the various characters. Other manipulation due to the original high-embossed characters being ironed flat and replaced by newly embossed characters can be recognized, on the one hand, by the fact that the information content of the two sets of characters deviates, and, on the other hand, by the fact that laser characters 4 no longer show the surface microrelief destroyed by the ironing.

FIG. 2 shows the cross-section A-B of identification card 1 shown in FIG. 1, in the area of the embossed and laser characters. The cross-section of high-embossed characters 3 shows that the character exists as a positive relief on the front of the card and as a coinciding negative relief 5 on the back of the card. All the various layers of the card compound (i.e. three layers in the example shown) are deformed in the same manner by the embossing process which is carried out from the back of the card 8. In the apex area of high-embossing 3, the characters are provided with a color layer 6 contrasting with the surroundings in the interests of better legibility.

Lasered characters 4 may be burned primarily in the front of opaque middle layer 9, as shown in FIG. 2. However, it is also possible to let the discoloration of the material take effect both through the cross-section of middle layer 9 and into cover film 7. Depending on the type or construction of the card, the laser writing may be provided only in the cover film or else throughout all layers of the card compound. It proves to be particularly advantageous to provide the laser writing along with the discoloration of middle layer 9 in cover film 7 as well coinciding with laser characters 4 together with a microrelief 10, the presence of which may then be checked manually as a characteristic feature of the laser writing.

FIG. 3 shows a further variant of the inventive means of protecting high-embossed characters. In this embodiment laser characters 4 are arranged as negative characters on top of high-embossed characters 3, coinciding with them. The high-embossed characters, which preferably should not be dyed in this case, appear as light characters on a dark background 11. The testing of authenticity and intactness is carried out with reference to the characteristic appearance and the microrelief of lasered card areas 11. Since the negative representation of laser characters 4 tends to arouse, in the embodiment shown in FIG. 3, the impression of a colored background structure, the double data record shown by the laser characters does not appear at all when observed superficially.

Manipulation must be ruled out in this example as well, since ironing the original characters flat simultaneously destroys the microrelief of the surroundings, since it is not possible to provide the ironed area of the card material subsequently with the characteristic discoloration without any transition, and since the laser shading cannot be removed in the area of the characters which might be newly embossed. Although the laser characters are present in this embodiment in a particularly unobtrusive form, both the former character and the newly applied one can be very easily recognized in the case of manipulation.

FIG. 4 shows the inverse case to FIG. 3. Laser character 4 is provided as a positive character on top of each high-embossed character 3, coinciding with it. In this embodiment it is in fact conceivable to add further characters subsequently to the card, since the dyeing of the apex areas of the high-embossed characters hides the laser characters from the visual observer and no microrelief can be provided in the apex area of the embossed characters due to the fact that the high-embossing functions as a printing block. After such a character has been newly embossed, however, the laser character remains present unchanged in the identification card material in this case as well, so that the laser character becomes visible after the dye on the apex area has been removed, making manipulation easy to recognize in this embodiment as well.

FIG. 5 describes the block diagram of an apparatus for producing the inventive identification cards.

In the apparatus shown as a dotted rectangle 21, virginal card 22, i.e. the neutral, unpersonalized identification card, is fed onto transport system 23 by an input unit. Transport system 23 conveys card 22 to a unit 24 where the magnetic stripe of the identification card is written on, then to a high-embossing unit 27 and subsequently to a unit 28 where the laser characters are applied. After completion of the laser writing, the completed personalized card 29 is finally deposited in a storage bin in the proper order relative to the other cards.

Each of writing units 24, 27 and 28 exhibits a memory in which the data to be processed by the particular unit can be intermediately stored. All three units are supplied with the particular data by a central memory 33. Central memory 33 receives its data, in turn, from a data tape provided to the card producer by the card-issuing institute involved. Central memory 33 also contains the integrated run-off control of the entire apparatus and a memory 34 in which the various card formats or various coordinate grids assigned to the various card formats are stored.

The order of units 24, 27 and 28 must not necessarily be the one stated here. The inventive cards may also be produced in a different order. However, it has proved especially useful to "write on" the magnetic stripe in the first unit, since the most errors usually occur in this unit and the production capacity of the system is least impaired when these "reject cards" are immediately eliminated and possibly used again after being cleaned. Furthermore, the laser writing on the card is unavoidable in the last unit whenever the laser writing is based on the previous dyeing of the high-embossed characters.

The focal point of the procedural sequence shown in FIG. 5 is that the data supplied from data tape 35 are brought in line with a coordinate grid assigned to the type of card and this data allotment according to coordinates makes it possible to write accurately in the different writing units 27 and 28. The apparatus functions, more precisely, as follows.

First, the entire personalization data for an identification card are read into the central memory from data tape 35 (if there is enough room in the memory, the data of several cards or even the entire data tape may also be read in). Depending on the type of card to be processed, the coordinate grid assigned to the cards in fixed storage in memory 34 is selected along with the type of writing and made the basis for the further processing of the cards.

The data intended to be written on the magnetic stripe are now read from the data tape of a card into memory 30, a virginal card 22 is taken singly from the input container and moved past magnetic heads 25 and 26. While the card is moved past, the magnetic data are recorded on the magnetic track of the identification card by means of magnetic head 25 and then read again by magnetic head 26. If comparison of the data read by magnetic head 26 with the recorded data in memory module 30 indicates identity, the card is transported further to the embossing unit. If the data are not identical, the card is separated out into reject pocket 36 and the process is repeated with a new card.

The cards separated out, for which the writing process was possibly disturbed merely by slight contamination of the magnetic stripe, can be reprocessed later, if required, after the magnetic stripe has been cleaned.

While the identification card is being transported to the embossing unit, the data to be embossed are precisely defined according to coordinates by being assigned to the coordinate grid determined in memory 34. Since the shape and dimensions of the various characters are known, it is now exactly fixed which areas of the card are to be provided with which embossed structures. The various characters are embossed in the embossing unit in the surface of the card according to their definition.

After the high-embossing process the data of the high-embossing unit are provided to the laser recorder. This may be carried out either by making the contents of memory 31 accessible or, as shown in FIG. 5, by re-storing in memory 32 of the laser recorder. In memory 32 the various characters are then adapted according to the initially selected type of writing, i.e. reduced in size or enlarged, converted into negative writing, etc., and assigned to the coordinate areas intended for them, i.e. overlapping the high-embossing coordinates, close beside them, etc.

After the local areas and the shape of the laser characters have been defined, the latter are also inscribed in the card. After completion of the laser writing the card is deposited in a pocket for finished cards.

In the course of the described procedural sequence, the type of writing shown in FIG. 3 is produced by having the laser recorder cover the entire high-embossed line or the line area provided with high-embossed characters, with laser lines very close together, reducing the beam energy in the area of the high-embossed characters at least to the extent that there is no discoloration of the card material in this area.

The overlapping of the high-embossed characters by identical positive laser characters, as shown in FIG. 3, is particularly critical due to the embossing tolerances to be taken into consideration and the necessity of providing the laser characters exactly on the apex line of the embossed characters. It can nevertheless be carried out without difficulty when the apex areas of the embossed characters are provided with a dye which, on the one hand, mixes very homogeneously with the card material and, on the other, absorbs the laser beam energy to a very high degree. When high-embossed characters prepared in this way are continuously brushed by a laser beam whose energy is set to be slightly below the reaction point of the card material not provided with the dye, sufficient energy for laser writing is only bound in the colored areas of the high-embossing. The advantage of this method is that only the coordinates of the line location, the line length and the line height must be taken into consideration for "lasering" the card. The information content of the various characters as well as their shape and size may be left out of consideration for the laser writing. Virtually all dyes may be used to color the high-embossed characters as long as they are composed on the same solvent basis as the card material and are colored by pigments which absorb the laser radiation. Since soot absorbs the entire spectrum from ultraviolet to infrared equally well, sooty dyes may be used in any case, regardless of the laser recorder used.

If dyes are used which greatly reflect the laser radiation instead of absorbing it, such as greatly reflecting metal dyes, the negative writing may be obtained without the troublesome bypassing of the high-embossed characters by writing over a large area of the high-embossed lines continuously using a laser beam whose energy is set to be just above the reaction point of the card material.

Similar successes may be obtained when the card material is provided, for example, with colorant printing over a large area, which changes its color under the effect of laser beam energy. In this case the apex areas of the high-embossed characters should also be provided with a reflecting dye which prevents the change of color by dampening the laser beam energy. The selection of such colorants is limited only by the requirement that the reaction temperature be higher than the laminating temperature of the identification card, i.e. higher than 180° C.

We claim:

1. A method of producing identification cards bearing alphanumeric characters, which are present in a high embossed form so as to be employable as a printing block, and further printed information in the form of alphanumeric characters or pictures, characterized by the following steps:
   (a) storing in a first memory a data record of the alphanumeric characters for high-embossing,
   (b) assigning the card coordinates to each of the characters to be high-embossed,
   (c) loading an embossing unit with the data for the characters, defined according to coordinates,
   (d) high-embossing a neutral card which may be provided already with magnetic data,
   (e) determining the areas of the card to be provided with lasered characters,
   (f) loading a laser recorder with the data for the characters, defined according to coordinates,
   (g) adapting these data to the requirements as to shape and size to be met by the characters for lasering, and
   (h) again inscribing the characters in the areas of the card intended for them, by means of a laser recorder.

2. A method as in claim 1, characterized in that the data are adapted in such a way that each high-embossed character has an identical character assigned to it, this character being inscribed in the material of the identification card by the laser recorder shifted to the side of the high-embossed character.

3. A method as in claim 1, characterized in that the data are adapted in such a way that the laser beam only brushes over the areas in which high-embossed data are to be provided.

4. A method as in claim 3, characterized in that the laser beam has its energy reduced in the area of the high-embossed characters in such a way that the high-embossed characters are not discolored by the laser beam.

5. A method as in claim 3, characterized in that the apex areas of the high-embossed characters are provided, before being exposed over a large area to laser energy, with a dye which absorbs the laser beam energy, and the energy of the laser recorder is adjusted in such a way that the card areas which are not provided with absorbant dye are not discolored by the laser beam, but there is discoloration in the area of the absorbant dye.

6. A method as in claim 3, characterized in that the apex areas of the high-embossed characters, before being exposed over a large area to laser beam energy, are provided with a dye which reflects the laser beam energy, and the energy of the laser recorder is adjusted in such a way that only the card areas which are not provided with the reflecting dye are discolored by the laser beam.

7. A method as in claim 6, characterized in that at least the areas of the card to be provided with high-embossed characters are additionally provided over a large area with colorants which show a change of color under the effects of the laser beam energy.

* * * * *